United States Patent [19]

Rees et al.

[11] 4,250,662

[45] Feb. 17, 1981

[54] METHOD OF SUPPORTING THE GROWTH OF GRASS, FLOWERING PLANTS, SHRUBS AND DECORATIVE PLANTS

[76] Inventors: David H. Rees, 315 Chestnut St.; Gerald A. Hickey, 110 W. Castle St., both of Mt. Shasta, Calif. 96067

[21] Appl. No.: 38,883

[22] Filed: May 14, 1979

Related U.S. Application Data

[63] Continuation-in-part of Ser. No. 843,436, Oct. 18, 1977, Pat. No. 4,154,174.

[51] Int. Cl.³ .............................................. A01G 1/00
[52] U.S. Cl. .......................................... 47/58; 111/1; 47/DIG. 10
[58] Field of Search ...................... 47/9, 58, 56; 111/1

[56] References Cited

U.S. PATENT DOCUMENTS 3,903,816  9/1975  Brem .................................... 47/56 X

OTHER PUBLICATIONS

Agricultural Uses of Bark, Bollen, 1969, USDA Forest Service Res. Paper PNW-77, pp. 18-25 relied on.

*Primary Examiner*—Robert E. Bagwill
*Attorney, Agent, or Firm*—Fulwider, Patton, Rieber, Lee & Utecht

[57] ABSTRACT

Remnants of incense cedar timbers, including bark, sawdust, woodchips and the like, when ground together form a composition useful in enhancing the growth of many species of desirable vegetation, including flowers, grass, shrubs and decorative plants. The ground incense cedar timber remnants aid significantly in the retention of moisture which can be extracted by the root systems of plants for nourishment. The ground composition of incense cedar timber remnants also retards the growth of weeds, inhibits the growth of fungi and suppresses infestation of the plants by harmful pests, such as insects.

11 Claims, No Drawings

METHOD OF SUPPORTING THE GROWTH OF GRASS, FLOWERING PLANTS, SHRUBS AND DECORATIVE PLANTS

BACKGROUND OF THE INVENTION

The present application is a continuation-in-part of U.S. Application Ser. No. 843,436, filed on Oct. 18, 1977, now U.S. Pat. No. 4,154,174, issued on May 15, 1977.

Field of the Invention

The present invention relates to methods of enhancing the growth of desirable plants and compositions useful for this purpose.

Description of the Prior Art

Man has historically sought to improve the agricultural productivity of crops and to enhance the growth of other desirable vegetation, such as flowers, grass, shrubs, and decorative plants. Many soil additives and mulches have been developed in attempts to increase and enhance such growth. Such materials may function as mulches, pesticides, fungicides or weed suppressants. Mulches usually are formed of loosely packed material which is generally spread upon the surface of the soil or mixed in surface soil to aid in protecting and enhancing the root growth of the plants to which the mulch is applied. Mulches are used to reduce water evaporation, maintain even soil temperature, prevent erosion, control weeds, or enrich the soil. Pesticides are frequently employed to protect crops and plants from insects, such as potato beetles, aphids, snails, locusts, mealy bugs, caterpillars, slugs, thrips, red spiders, mites and other pests. Fungicides, on the other hand, are employed to protect crops and other desirable vegetation from fungi, such as rusts, mildew, scale, smuts, and other deleterious thallophytic growths. Conventional weed suppressants are typically chemical agents which when applied to weeds burn the broad leaves of weeds, but do not hinder the growth of grass, for example. The expenditures involved in providing such soil additives, mulches, pesticides and fungicides throughout the United States and elsewhere is enormous. It is conventional practice to apply an insecticide or fungicide to agricultural fields of potatoes, wheat or corn at least once during the normal growth cycle of these vegetables. In addition, weed killing agents are conventionally applied to grass seedlings in commercial sod growing operations.

In the past, there have been repeated attempts to provide agricultural soil conditioners, mulches, pesticides, fungicides and weed suppressants at a reduced cost. Mulches comprised of hay or straw have been used to promote the growth of edible crops. In the spring, such crops, as seed potatoes, may be laid upon the top of unharvested crop remnants, such as corn stalks, strawberry plant leaves and hay left from the previously growing season. The seed potatoes may be mulched with a heavy hay blanket and grown therein. Other systems of crop and vegetation enhancement have sought to employ wood products as a soil treatment or mulch. In one such system it is suggested that unprocessed wood chips scattered about plants and vegetables may provide an effective mulch. Other systems employ more exotic treatment of wood products before utilizing them as an agricultural aid. For example, ground pine bark or sawdust has been treated, enriched with fertilizers, and used as a soil additive. Likewise, finely shredded fiber and dust-like particles of the bark of the redwood tree, and cedar sawdust have been treated, enriched with fertilizers and similarly used as a soil conditioners. Peat moss is widely used as a mulch to enhance the growth of vegetation.

The mulches comprised of wood and wood products have a high acid content which, when used as a soil conditioner, has been recognized and has been considered to be undesirable, although sometimes tolerable. While some plants prefer an acidic soil condition, the acid level of conventional wood product mulches and soil conditioners exceeds the acid level preferred by virtually all plants, so that these conventional wood products are subjected to extensive pretreatment prior to application to the soil. For example, shredded redwood fiber and bark has been reacted with ammonia at elevated pressures and temperatures to improve the nitrogen content. A costly autoclave is required in this connection, however, and the batch processing of redwood bark and dust is ill suited to the large quantities required of soil treatment materials. On the other hand, redwood barks have also, in the past, been used as filtering agents for sewage waste systems and, after drying, utilized as fertilizers and soil conditioners. Again, however, expensive and time consuming treatment has been required to transform the redwood material from its natural state to a material useful for application to soil for growing desireable vegetation. Similarly, cedar sawdust has been utilized for soil conditioning purposes, but only after extensive pretreatment and with enrichment with fertilizers. Peat moss is formed by the decay of sphagnum mosses that grow only in wet acid areas. The remains of these mosses become compacted with other plant debris to form peat.

There currently exists a significant shortage in conventional, low cost soil conditioners and mulches. Redwood compost has become exceedingly scarce, and both redwood compost and peat moss have risen drastically in price.

SUMMARY OF THE INVENTION

There presently exists a material which has heretofore been regarded as a undesirable waste by-product, produced by lumber mills that process timber in the manufacture of wooden pencils, and other wood products. This material is known in the trade as "cedar hog fuel" and is a mixture of incense cedar bark, sawdust and wood. According to the present invention, it has been discovered that these cedar wood processing remnants may be utilized, when ground into small particles, as a soil conditioner to enhance the productivity of certain agricultural crops and to promote and support the growth of desireable rooted greenery, including grass, shrubs, and decorative plants, and to similarly promote and support the growth of flowers.

The principal characteristic of ground cedar hog fuel, when used as an agricultural and garden product, lies in its superior moisture retaining capability and ease of wetting compared with numerous other test materials, including cedar tow (western red cedar wood shavings produced as a by-product in the manufacture of cedar roof shingles), sand, peat moss and redwood compost.

A secondary benefit of the use of ground incense cedar hog fuel for supporting plant growth is its relatively high potassium content, this element being one of the major nutrients required for plant growth. Although low concentrations of available nitrogen are present in cedar hog fuel as ammonia, and in other forms, plants do benefit from the addition of nitrogen enriched compositions in a growth supporting medium containing cedar hog fuel. Such nitrogen enrichment is easily supplied to some extent merely by mixing the cedar hog fuel with soil. Such a mixture has the further benefical effect in that the natural toxicity of the ground cedar hog fuel is buffered by the soil. In this regard, the toxicity of incense cedar hog fuel is slight, as compared with western red cedar products including ground cedar hog fuel. Tow, a different western red cedar product, has a far greater toxicity to plant growth than either incense or western red cedar hog fuel. The western red cedar products, in the absence of soil, are inherently too toxic to function as a medium within which plants may be grown to maturity. However, when ground western red cedar hog fuel was used as a mulch on tillable soil, the toxic nature was buffered sufficiently to allow plant growth. The same is not true of cedar tow which continued to inhibit seed germination. Since the incense cedar hog fuel showed the least toxicity to plants when used as a growth medium, its toxicity is most readily buffered by soil. Ground cedar hog fuel, both incense cedar and western red, have value when used as mulches to enchance moisture retention by the soil, and to serve as a pesticide and fungicide. The cedar hog fuel may be ground into particulate forms with a maximum dimension of one inch or less, or the ground cedar hog fuel may be sifted for the fine powderous particulates contained therein.

Ground incense cedar hog fuel has an ability to support the growth of vegetation when used alone as a potting medium, although growth may be slightly retarded if cedar hog fuel is the sole growth supporting medium. With the addition of soil in some percentage as a buffering medium, this retardation is eliminated and the incense cedar hog fuel-soil mixture performs as a superior potting soil. Moreover, when used as a mulch the incense cedar hog fuel exhibits a superior degree of moisture retention and ease of wetting to enable the establishment of vegetation on extremely compacted, nontillable soil under conditions of heat stress. The superior moisture retaining quality of the incense cedar hog fuel products prevents heat losses in desireable vegetation during hot, dry spells remarkably well as contrasted, for example, with peat moss.

Western red cedar hog fuel exhibits a much higher degree of growth retarding effect then incense cedar hog fuel when used alone as a growth medium. This toxicity allows western red cedar hog fuel to be of only marginal value for use as a potting soil, even when mixed with higher proportions of soil to buffer its toxicity. When used as a mulch, lawn dressing, or for seeding however, the toxicity is sufficiently buffered so that the moisture retaining characteristics of the ground western red cedar hog fuel provide desirable vegetation with valuable moisture, especially during periods in which the plants grown therein receive little additional moisture. Furthermore, the high level of acidity of the ground western red cedar hog fuel product in particular is not incompatible with the preference for acid soil exhibited by such decorative house plants as aralias, dieffenbachias, scheffleras, crotans, coleus, African violets and numerous other decorative plants.

Ground cedar hog fuel is much more useful in conserving moisture for nourishment of plant root systems than is peat moss, and either incense cedar hog fuel or western red cedar hog fuel may be used in the same manner as peat moss for lawn care. Cedar hog fuel is normally applied over a seeded area to hold moisture and enhance germination and juvenile plant growth. It may be used to build turf and seed poor areas of spotty growth. Moisture applied to the ground cedar hog fuel readily wets the medium and soaks into it. This occurs even after the cedar hog fuel has been thoroughly dried. Water applied to peat moss, however, tends to run around it into the soil. This is particularly true when peat moss has been dried out. Once dried, peat moss becomes very difficult to wet evenly again.

A further feature of the present invention is the weed retardant effect which the ground cedar bark, sawdust and wood remnants have on soil in which agricultural crops, decorative grass, shrubs, plants with flowers and decorative plants are grown. Weeds are noticeably absent from test plots employing the cedar trimming remnants in accordance with the present invention as contrasted with unenriched soil or soil employing other mulches. Moreover, the cedar hog fuel is not harmful to flowers or decorative plants as are conventional weed killers.

In addition to its other advantages, utilization of the ground cedar hog fuel in accordance with the invention obviates the need for pesticides which are normally required to suppress potato beetles, lawn moths, aphids, locusts, snails, caterpillars, mites, thrips, red spiders, mealy bugs and other pests. Cedar hog fuel is very effective in suppressing nematodes, larvae, crawling insects (except ants), snails, slugs and worms. Furthermore, utilization of the invention also obviates the need for fungicides which are normally required to suppress rusts, scale, mildews, smuts and deleterious thallophytic plants. A point of interest in this regard is that although ground cedar hog fuel can be utilized to grow numerous crop vegetables, such as potatoes, beans, carrots, onions, radishes, turnips and lettuce, cedar hog fuel suppresses the growth of mushrooms. This is consistent with the characteristic suppression by the cedar hog fuel of the growth of fungi or thallophytic plants. Ground cedar hog fuel also suppresses the growth of common garden weeds, and weedlike grasses, such as seedling Johnson grass. Also, unlike redwood composts, cedar hog fuel does not leave splinters, which can be quite annoying during application.

Because cedar hog fuel exhibits pesticidal and fungicidal properties and is herbicidal to weeds, it may well be desireable to isolate the activate chemical components of cedar hog fuel so that these components may be created synthetically and/or in greater concentrations. This can undoubtedly be achieved using gas chromotography, spectrographic analysis, and other conventional laboratory analytical techniques. A laboratory analysis of a water extract of dried air samples of incense cedar hog fuel, expressed on the basis of the air dried weight of the samples, shows the following results.

| pH | EC umho/cm | PPM | | | | |
|---|---|---|---|---|---|---|
| | | $NO_3$ | $NH_4$ | N Total | | |
| 5.3 | 175 | <1 | 28 | 84 | | |
| | | P | K | Zn | Na | Cl |
| | | <0.2 | 351 | <0.5 | 45.3 | 144 |

Cedar lumber mill remnants or "cedar hog fuel" is produced in the processing of cedar timbers in a saw mill. In the processing of cedar timbers in the manufacture of wooden casings for lead pencils, the cutting of boards for use in building construction, and for other specialized purposes, cedar logs are cut in varying lengths and are stripped of their bark by a machine called a log barker. This bark is cut away in large chunks and typically falls to a conveyor where it is carried to a device called a hammer hog and then to a storage location. The stripped logs are then longitudinally cut into boards, pencil casing stock, or other convenient sizes with the logs positioned so that the resulting sawdust and other debri also falls on the conveyor and is also transferred to the hammer hog and later to a storage location. These trimmings of cedar logs also include wood chips, splinters, cedar twigs, burls and knots. All of these cedar trimming components are typically mixed together as they are processed through the hammer hog. A hammer hog is a machine employing a massive hammer-like weight to pulverize the cedar trimmings into relatively small particles as they are received from the conveyor. The resulting material eminating from the hammer hog is turned "cedar hog fuel". Cedar hog fuel has heretofore been considered to be largely a nuisance, and has been utilized for value to any significant extent only for the purpose of burning for heat.

According to the present invention, the cedar timber remnants, referred to above as "cedar hog fuel" are ground and utilized as a mulch, soil additive or potting soil for certain crops, grass, flowering plants, shrubs and decorative plants. The grind fineness of the cedar hog fuel may be varied according to the application for which it is to be used. For most applications, the cedar hog fuel should be ground so that the maximum dimension of the ground particles is no greater than one inch. In its coarser state, ground cedar hog fuel finds a highly beneficial application as a top mulch and soil conditioner. The long fibers and wood chips of the coarser grind areate and loosen the soil and are quite useful for shrub planting and potting or canning. The coarser ground cedar hog fuel product will not biodegrade as rapidly as the very fine product. More typically, the cedar hog fuel is ground to a fineness having a maximum dimension of no greater than one half inch. When used as a potting soil, the cedar hog fuel should be ground even finer to a uniform granular consistency. In any grinding operation of the cedar hog fuel, a certain amount of very fine powderous particulates are produced. These particulates may be separated from the coarser ground product by sifting through a screen. When collected, these particulates may be utilized as a fine powderous product, sometimes referred to as "cedar hog fuel fines". Cedar hog fuel fines are of particular benefit when used as a potting soil or as a lawn top dressing or for dry root packaging.

The following specific examples are illustrative of the agricultural, plant nursery, and sod growing techniques which may be used in performing the method of the present invention and the utilization of the product thereof, but it is to be understood that the invention is not to be limited to the specific details of these examples.

EXAMPLE 1

Test plots were prepared, each plot being approximately 25 inches wide by 47½ inches long. These plots were numbered 1–6 inclusive. The plots were located in Weed, Calif. and the experiments were conducted during the month of May, the start of the growing season in that area. The natural soil in that area is sandy, volcanic soil.

One cup of grass seed was dispersed evenly across plot numbered 1. The grass seed used was a mixture designed to be grown in sun and light shade. The seed composition was as follows creeping red fuscue-34.2%; chewing fescue-31.36%; Kentucky blue grass - 10.20%; annual rye grass-19.40%. The grass seed also included other ingredients including 0.64% crop seed, 3.32% inert matter and 0.16% weed seed. The plot was then covered with between ¼ and ⅜ inches of a treated redwood compost comprised of a mixture of redwood bark, sawdust and wood chips, treated and processed by Arcata Redwood Company, Arcata, Calif. 75521 and marketed under the brand name Arco Redwood Compost.

In the second plot a ¼ inch layer of the same redwood compost was placed on the plot surface. One cup of the same grass seed was then uniformly sprinkled across the plot. The grass seed was then lightly mixed into the redwood compost by hand.

In the third and fourth plots two cups of the same grass seed were sprinked evenly across the bare tilled soil. Grass seed was then raked into the soil to a depth of approximately ⅛ inch.

In the fifth plot, one cup of the same grass seed was evenly spread across the plot and covered with a layer of incense cedar hog fuel, ground to a maximum dimension of no greater than ½ inch and spread evenly in a layer of between ¼ and ⅜ inches in thickness. In the sixth plot, a quantity of incense cedar hog fuel, of the same grind used in the fifth plot, was spread in a layer ¼ inch thick across the plot surface. One cup of the same grass seed was spread evenly across the plot and lightly mixed into the cedar hog fuel by hand.

After the foregoing plantings, the plots were all watered with a sprinkler uniformly for about one hour. Thereafter an automatic timer for the sprinkler was set to water the plots uniformly one hour a day in the mornings. The same watering procedure was continued for about 51 days, whereupon it was determined that plots 5 and 6 appeared to be inordinately wet and were possibly suffering from overwatering. As a consequence, the watering procedure was changed to manual watering approximately one hour every two to three days.

Ninety eight days later the grass in the redwood compost plots 1 and 2 was extremely poor. Grass in the control plots 3 and 4 was growing very well, but was overgrown with weeds. Grass in the cedar hog fuel plots 5 and 6 appear to be significantly better than in plots numbers 1 and 2, and there was virtually no weed growth in the cedar hog fuel plots numbers 5 and 6. Also, there was no sign of yellowing of grass in the cedar hog fuel plots 5 and 6, although the grass in plots numbers 1 and 2 was somewhat yellow.

It is anticipated that both western red and incense cedar hog fuel could be ground and used without the addition of dirt to support the growth of grass for sod. To do this, the cedar hog fuel should be ground to long, fiberous particles having a maximum dimension of no greater than one inch in length. Preferably, these particles would have a maximum dimension no greater than ¼ inch in length for use as in lawn care and seeding products. The cedar hog fuel should then be placed in bins to a depth of about three inches and grass seed should be planted in the cedar hog fuel. Because cedar hog fuel retains moisture so well, watering can be less frequent than in other commercial sod growing practices. Also sod can be grown according to the present invention in more arid locations then is presently commercially feasible.

Cedar hog fuel might typically be used as a top dressing. Soils containing considerable clay can be conditioned with a long fiber cedar hog fuel conditioner prior to seeding. Thereafter, the soil can be dressed with cedar hog fuel fines after seeding for moisture retention at the surface.

To grow sod using the cedar hog fuel as suggested, the grass seed is allowed to germinate and to mature at a temporary location. Germination is reduced by watering as required so that the grass seed develops a root system at the temporary location at which it is grown. The grass root system will develop evenly in the growth supporting cedar hog fuel. When the grass has reached sufficient maturity, the layer of growth supporting cedar hog fuel bearing the root system can be stripped from any underlying cedar hog fuel. The strips of sod are then typically rolled and transported for relocation to a permanent site. Sod may be supplied for residential lawns in this fashion. By the time the sod is stripped from its temporary location, the grass root system will have become enmeshed in the growth supporting cedar hog fuel which continue to provide nourishment and moisture during transport. Because of the moisture retention characteristics of cedar hog fuel, the grass in the sod will more readily survive the transplanting procedure, as compared with grass sod grown according to conventional practices.

A further feature of incense cedar hog fuel is its ability to support growth of most lawn grasses, flowering plants, shrubs and decorative plants by itself in the absence of soil. Accordingly, grass can be grown directly in a layer of ground incense cedar hog fuel which can thereafter be cut into strips, rolled and transported in the manner previously described. Transportation and handling are facilitated by using the ground cedar hog fuel in this fashion, since the cedar hog fuel is lighter in weight than soil. When grass is grown in a layer of ground cedar hog fuel, the root system will develop directly in the ground cedar hog fuel, and will not seek to penetrate the cedar hog fuel to the soil beneath. It is useful, however, to locate a layer of ground cedar hog fuel above soil, since the incense cedar hog fuel does have some low level toxicity which is readily leached therefrom by soil therebeneath.

EXAMPLE 2

A quantity of incense cedar hog fuel was ground to a fine mulch in a conventional kitchen blender. A blender, model 215, rated at 350 watts and manufactured by the Hamilton Beach Company, Chicago, Ill. was used for this purpose. The ground cedar mulch was used as a potting soil for grass seed. The grass seed was laid on native soil with a ½ inch layer of the finely ground cedar mulch above it. Planting was at approximately 10 pm on the first day.

After exposure to the daytime sunlight, and with watering it was determined after 87 hours that the grass seed had germinated. The cedar hog fuel reduced both the amount of water required and the frequency of watering, and demonstrated the ability of cedar hog fuel to allow grass to be grown in locations otherwise too arid to adequately support the growth of grass as a ground cover.

EXAMPLE 3

Ground cedar mulch was prepared as in Example 2. Two begonia tubers were planted using only the finely ground mulch in separate 6 inch diameter clay pots as the sole growth supporting medium. Four days after planting the begonias had sprouted and broken through the surface of the mulch to the air. The flowers were then grown to maturity entirely within the finely ground cedar hog fuel.

EXAMPLE 4

Four African voilets were originally grown in soil, and then repotted to separate six inch pots containing only cedar hog fuel ground to a maximum dimension of ½ inch. The African violets continued to flourish and bloomed entirely within the cedar hog fuel.

EXAMPLE 5

Rhododendrons, initially grown to maturity in conventional potting soil were repotted in a mixture of cedar hog fuel and potting soil. The cedar hog fuel used was first ground to a fineness of a maximum dimension no greater than ½ inch.

Other shrubs and plants have similarly been grown within cedar hog fuel and cedar hog fuel/soil mixtures. Ferns, creeping jew, wandering jew and succulent plants have likewise been grown within cedar hog fuel. Any slightly acid loving flowering plants, shrubs, grass or decorative plants may be grown in incense cedar hog fuel in the manner previously described. Such acid loving plants include orchids, dieffenbachias, ferns, aralias, schefflerias, crotons, African violets, coleus, burro tail and other decorative house plants. Various ferns thrive on an incense cedar hog fuel medium ground and sifted through a ½ inch screen without any soil in the pots which they are planted. Cedar hog fuel may also be used as a garden mulch. By way of example, junipers, Japanese yews, magnolias, natal plums and other lawn and garden shrubs are typically grown at plant nurseries and are either balled or potted in soil. Such plants can be grown and potted in a half and half mixture of cedar hog fuel and soil or in a mixture of cedar hog fuel and less than 25% actual dirt or soil. Furthermore, plants grown in nurseries either according to conventional practices, or according to the method of the present invention, can be replanted in lawns and gardens by digging an oversize hole at the site where the plant is to be located. A quantity of cedar hog fuel of a volume approximately equal to the volume of the ball of the plant roots, or the pot in which the plant is transported is placed in the hole. The cedar hog fuel in the hole is watered and the plant is then placed on the cedar hog fuel. Soil and any remaining ground cedar hog fuel is then packed about the plant to cover the roots. Preferably, the surface of the soil immediately adjacent the trunk or stalk of the shrub is covered with ground cedar hog fuel and watered. Slightly acid loving plants of the type described will thereafter thrive in the environment of the ground cedar hog fuel. Moreover, plants treated in this fashion will remain more luxuriant during periods in which water is not provided than will plants whose roots are not surrounded by the cedar hog fuel mulch. The cedar hog fuel around the roots of these plants and the cedar hog fuel on the ground about the emergent plant growth is more easily wetted and retains moisture better than conventional mulches, such as peat moss. This water retaining characteristic aids the plants and allows them to continue to thrive despite hot, dry conditions.

The cedar hog fuel of the invention not only provides a means for retaining water for nourishment of the plants with which it is used, but also actively suppresses insects, pests, weeds and fungi of the type previously described. Plants positioned or grown in ground cedar hog fuel, or cedar hog fuel/soil mixtures are thus much more likely to thrive and survive despite the presence in the vicinity of such pests, fungi and weeds.

While the invention has been described in the examples and explained in connection with plantings of particular vegetables and flowers according to exemplary conditions, it should be understood that these specific examples and illustration are for explanatory purposes only. The invention has a wide range of application, both to enhance the growth of agricultural crops, as well as in the support and growth enhancement of numerous flowers, shrubs, decorative plants and grasses. Accordingly, the invention should not be considered limited to the specific examples and uses referred to in detail herein. Rather, the scope of the invention is defined in the claims appended hereto.

We claim:

1. A method of enhancing the growth of rooted greenery comprising locating the root system thereof in a growth supporting medium including a quantity of ground incense cedar timber remnants including bark, sawdust and wood.

2. A method according to claim 1 further characterized in that said greenery includes grass.

3. A method according to claim 2 further comprising planting grass seed in said growth supporting medium at a temporary location, inducing said seed to germinate and develop a root system at said temporary location, whereby said root system develops primarily within said growth supporting medium, and relocating said grass together with said growth supporting medium with said root system enmeshed therein to a permanent location.

4. A method according to claim 1 further characterized in that said greenery includes shrubs.

5. A method according to claim 4 further comprising initiating the growth of said shrubs in a medium comprising soil and thereafter transplanting said shrubs into the aforesaid growth supporting medium.

6. A method according to claim 1 further characterized in that said greenery includes decorative plants.

7. A method according to claim 6 further comprising potting said decorative plants in said growth supporting medium.

8. A method according to claim 1 wherein said composition of ground cedar timber remnants comprises at least 50% of the dry weight of said growth supporting medium.

9. A method according to claim 1 further comprising mixing said ground cedar timber remnants into soil.

10. A method according to claim 1 further comprising mixing said composition of ground cedar timber remnants with soil to form said growth supporting medium.

11. A method of enhancing the growth of plants having flowers comprising locating said plants in a growth supporting medium including a quantity of ground incense cedar timber, remnants including bark, sawdust and wood.

* * * * *